United States Patent

[11] 3,593,391

| [72] | Inventor | Benjamin I. Routh |
| | | Great Bend, Kans. |
| [21] | Appl. No. | 857,256 |
| [22] | Filed | July 17, 1969 |
| [23] | | Division of Ser. No. 544,623, Apr. 22, 1966, Pat. No. 3,482,007 |
| [45] | Patented | July 20, 1971 |
| [73] | Assignee | Rice Engineering & Operating, Inc. |
| | | Great Bend, Kans. |

[54] APPARATUS FOR LINING A PIPE
5 Claims, 7 Drawing Figs.

[52] U.S. Cl. .................................................. 25/38,
264/269, 285/55, 249/114
[51] Int. Cl. ........................................................ B28b 21/42
[50] Field of Search .......................................... 25/38, 31,
30 R, 126; 264/71, 269, 313; 249/112, 114;
285/55

[56] References Cited
UNITED STATES PATENTS
3,125,124  3/1964  Daniels et al. ................. 264/269 X
3,206,821  9/1965  Keyser et al ...  25/38

Primary Examiner—J. Spencer Overholser
Assistant Examiner—Dewalden W. Jones
Attorney—William S. Dorman ABSTRACT: Apparatus for lining a pipe section with a plastic tube mounted within the pipe in concentric relation therewith, said plastic tube being longer than said pipe section and having an outer diameter less than the bore of said pipe section so as to form an annular space therewith for substantially the full length of said pipe section, a first head engaging one end of said pipe section and said tube, a second head engaging the other end of said pipe section and said tube, said first and second heads supporting said tube in concentric relation with respect to said pipe section, said heads also constituting sealing means for closing the ends of said annular space adjacent the ends of said pipe section, said first head being provided with a first port communicating with said annular space and with the atmosphere, said second head having a second port communicating with said annular space and the atmosphere, and means for introducing a cement slurry under pressure into said annular space through one of said ports so as to fill said annular space.

INVENTOR.
Benjamin I. Routh

INVENTOR.
Benjamin I. Routh
BY
William S. Dorman
ATTORNEY 3,593,391

APPARATUS FOR LINING A PIPE

This application is a division of my copending application Ser. No. 544,623, filed Apr. 22, 1966, now Pat. No 3,482,007.

The present invention relates to an apparatus for lining a pipe and, more particularly, to an apparatus for lining a pipe with a thin layer of plastic material.

The advantages of lining a pipe with plastic or similar material are well recognized particularly where the liquid or fluid would be otherwise corrosive to the pipe itself. In this regard, it should be mentioned that there are many different methods and techniques for lining a pipe with plastic or similar material using various coating methods and apparatus, using various arrangements of thermoplastic tubes, thermosetting compounds and cements; the various methods and apparatus of the prior art are so manifold and diverse that further enumeration is deemed unnecessary.

The present invention, briefly stated, relates to the lining of an elongated pipe section having a pin end with external threads thereon and an enlarged coupling end with internal threads thereon; it should be understood that the internal threads of the coupling end are adapted to mate with the external threads on the pin end of another pipe section of the same diameter and size as the first-mentioned pipe section. The method and apparatus of the present invention includes the supporting of a relatively thin plastic tube within the internal bore of the pipe section in substantially concentric relation with the bore of the pipe. The external diameter of the tube is less than the internal diameter of the bore of the pipe section such that an annular space is formed between the tube and the pipe section. The means for supporting the plastic tube in this concentric relationship include head members engageable with the pin end and coupling end respectively. Each head is provided with a port communicating with the annular space and with the atmosphere. Each head also includes a sealing means for closing the annular space adjacent the ends of the pipe. Means are provided to support the assembly of pipe and tube in an inclined position. Means are provided for introducing a cement slurry into the annular space. Finally, means are provided to vibrate the support during the time that the annular space is being filled with cement slurry.

The method and apparatus of the present invention is set forth in greater detail, as will appear hereinafter, in terms of the sizes and shapes of the heads which mate with the pin end and coupling end respectively of the pipe section. For example, the head for the pin end is provided with internal threads and with a hole substantially equal in diameter to the outer diameter of the plastic tube; this last-mentioned head is also provided with an O-ring which bears against the outer surface of the plastic tube so as to seal the annular space at that end of the pipe section. The head which engages the coupling end of the pipe section is provided with external threads which mate with internal threads at the coupling end; the latter head is also provided with an annular shoulder surrounding an inner portion of reduced diameter. The portion of reduced diameter is substantially equal to the inner diameter of the plastic tube and is provided with an O-ring which seals against the inner surface of the tube thereby closing the annular space at the coupling end of the pipe section. Preferably, the plastic tube is flared at the coupling end of the pipe section as this flare will rest against the shoulder mentioned above.

Further details of the invention will appear hereinafter.

Therefore, it is the principal object of the present invention to provide an apparatus for lining a pipe with plastic material in a manner which is superior to the corresponding teachings of the prior art.

It is a further object of the present invention to provide an apparatus for lining a pipe as set forth herein which involves positioning a plastic tube within the internal bore of the pipe and in concentric relation therewith, said tube having an outer diameter less than the inner diameter of the pipe so as to form a resulting annular space, sealing the ends of the annular space and thereafter introducing a cement slurry into the annular space, the outer ends of the plastic tube being flared outwardly after the cement slurry has hardened.

It is a still further object of the present invention to provide an apparatus for lining a pipe as set forth above wherein the assembly of pipe and tube is inclined during the time that the cement slurry is being introduced, the cement slurry being introduced through a port adjacent the bottom of the incline.

It is another object of the present invention to provide a method and apparatus for lining a pipe as set forth above wherein a second port is provided at the upper end of the incline communicating with the annular space and the atmosphere.

It is yet another object of the present invention to provide a method and apparatus for lining a pipe as set forth above wherein a screen is mounted in the upper port covering the cross-sectional area thereof.

It is another object of the present invention to provide a method and apparatus for lining a pipe as set forth above wherein the pipe and tube assembly is vibrated during the time that the cement slurry is being introduced into the annular space.

Other and further objects and advantageous features of the present invention will hereinafter more fully appear in connection with the detailed description of the drawings in which FIG. 1 is a partial sectional view of a pipe section showing the plastic tube mounted therein and held in position by the heads connected to the end of the pipe section; the pipe section and tube are broken midway between their ends so that the details of the ends can be shown;

Figure 1:
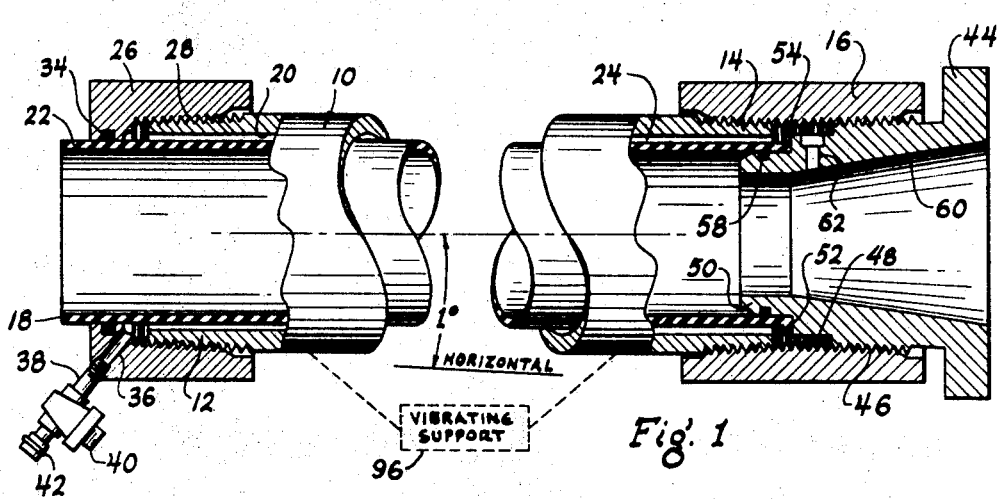

Referring to the drawings in detail, FIG. 1 shows a pipe section generally designated by the reference numeral 10. One end of the pipe section is provided with external and tapered threads 12; this end of the pipe section will hereinafter be referred to as the pin end. The other end of the pipe section is similarly tapered at 14; however this is connected to a coupling member 16 which is snugly secured to the threads 14 and is generally "permanently" associated with the pipe section 10. The end of the pipe section having the coupling member 16 mounted thereon will be hereinafter referred to as the coupling end of the pipe section. An elongated plastic tube 18 is mounted within the pipe section 10 as shown. The pipe section 10 has an internal bore 20 which is of uniform diameter throughout the length of the pipe section (except for the enlarged opening in the coupling 16). The plastic tube 18 has an external diameter 22 which is smaller than the diameter of the bore 20 so as to provide an annular space 24 between the pipe section 10 and the tube 22.

At the left hand or pin end of the pipe section 10 there is mounted a head 26 (see also FIG. 4) having internal threads 28 which mate with the threads 12. The head 26 is also provided with a circular opening 30 of reduced size and having a diameter substantially equal to the outer diameter 22 of the plastic tube 18. Within the hole 30 there is provided an annular recess 32 for receiving therein an O-ring 34. The relationship between the opening 32, the O-ring 34 and the outer diameter 22 of the plastic tube 18 is such that the left-hand end of the annular space 24 is closed at the pin end of the pipe section. However the head 26 is provided with an inclined port 36 communicating at its outer end with the atmosphere and at its inner end with the annular space 24. The outer end of the port 36 can be connected to fitting 38 including a cutoff valve 40 and quick-disconnect coupler 42 for purposes which will hereinafter appear.

Figure 5:
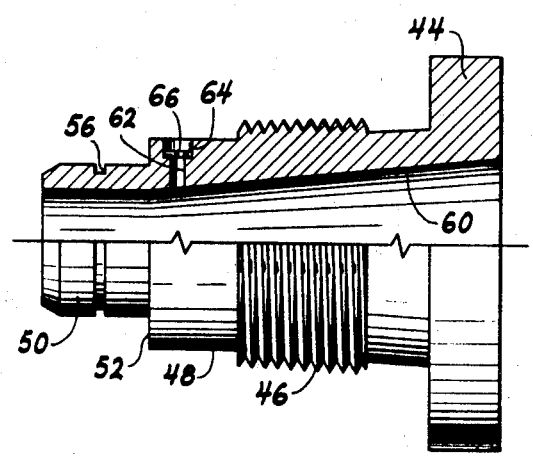
FIG. 5 is a partial sectional view showing the details of a head to be used in association with the coupling end of the pipe section.

A second head 44 (see also FIG. 5) is mounted at the right-hand or coupling end of the pipe section 10. The head 44 is provided with external threads 46 on one portion thereof which mate with the threads 14 on the coupling 16. The head 44 is also provided with a first circumferential portion 48 of reduced diameter with respect to the threaded portion 46. The head 44 is also provided with a second circumferential portion 50 of reduced diameter with respect to the first circumferential portion 48. The first and second circumferential portions, 48 and 50, respectively, are joined by a radial shoulder 52. The right-hand end of the plastic tube 18 is flared outwardly at 54 and is received over the circumferential portion 50 with the flare 54 abutting against the shoulder 52. The circumferential portion 50 is provided with an annular recess 56 which is adapted to hold another O-ring 58. The external diameter of the circumferential portion 50 is substantially equal to the internal diameter of the plastic tube 18. The relationship between the internal diameter of the plastic tube 18, the O-ring 58, the head 44 and the coupling 16 is such as to provide a seal or closure for the right-hand or coupling end of the annular space 24.

The head 44 is provided with an internal bore 60 which communicates with the interior of the above-described assembly. The circumferential portion 48 is provided with a port 62 which communicates at its upper end with the annular space 24 and at its lower end with the atmosphere (through the bore 60). The upper end of the port 62 may be provided with an enlarged portion 64 in which a screen 66 can be mounted.

Figure 4:
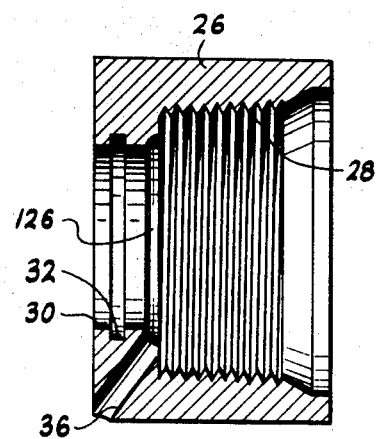
FIG. 4 is a sectional view showing one embodiment of head to be employed at the pin end of the pipe section.
Figure 6:
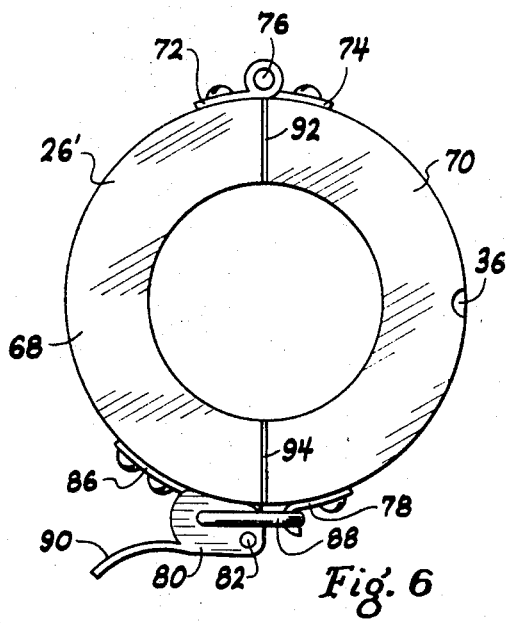
FIG. 6 is an end elevation of a modified form of the head shown in FIG. 4.
Figure 7:
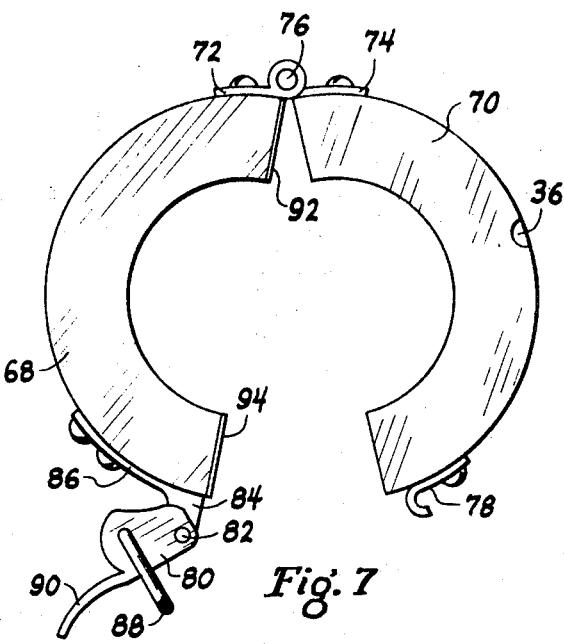
FIG. 7 is a view similar to FIG. 6 showing the parts in their open position.

FIGS. 6 and 7 show a modified form of the head 26 shown in FIG. 4. In these figures the head 26' is split, in effect, by a plane passing through the longitudinal centerline of the head so as to form a left-hand section 68 and a right-hand section 70 connected by means of hinge sections 72 and 74 and pin 76. The hinge sections 72 and 74 are connected to the head portions 68 and 70, respectively, by means of bolts or any other suitable means. The lower end of head section 70 is provided with a hook member 78 which is secured to the head section by any convenient means. The lower end of head section 68 is provided with an arm 80 which is pivotally mounted at 82 on an ear 84. The ear 84 is part of a strap 86 which is connected to the head section 68 by any convenient means. A link or loop 88 is pivotally mounted on the arm 80 to the left of the pivot connection 82. The right-hand end of the link 88 is adapted to engage the hook 78 so as to hold the head sections 68 and 70 together as shown in FIG. 6 when the arm 80 is pivoted to its extreme clockwise position. The arm 80 is provided with a small handle 90 to permit the opening and closing of the resulting latch just described above. In order to provide an effective seal between the mating surfaces of the head sections 68 and 70 rubber gasket members 92 and 94 are connected to the head section 68 so as to be disposed between the mating surfaces when the head sections are closed as shown in FIG. 6.

For the purpose of providing a detailed description of the method and apparatus of the present invention a specific example will now be given. However it should be understood that this specific example is offered primarily for illustration purposes and should not be considered as limiting with respect to the scope of the invention.

EXAMPLE

In this instance the pipe section 10 to be lined should be considered as a string of 2⅜-inches O.D. external upset, 4.600, seamless, 8 round thread tubing. This is a common tubing used in the oil production industry. Thus this string of tubing (or pipe section) can be more precisely considered as a steel pipe having 2.375-inches O.D. with an I.D. of 1.995 inches, thereby resulting in a wall thickness of 0.190 inches. The plastic tube 18 is a polyvinyl chloride (PVC) (Class 160) having an O.D. of 1.900 inches and an I.D. of 1.754 inches, thereby resulting in a wall thickness of 0.073 inches (73 mils).

From the above it would appear that there will be a clearance of 0.0475 inch (47½ mils) between the two pipes thereby defining the annular space 24.

Although ranges of steel tubing vary considerably, it was decided to use Range 2 tubing which by API standards runs from 28 feet to 32 feet in length. With this variation, it is possible to use a standard 32-foot length of PVC liner. This gives a variation in the amount of PVC liner that must be cut off from 0 to 4 feet.

In order to provide flare 54 on the end of the PVC liner, a thermostatically controlled electric heater is used. The thermostat is set to maintain a temperature of 280° F. The end is flared oversize and then cut with a hole saw to an O.D. of 2.35 inches.

The special heads 26 and 44 are made of cold-rolled steel, are shaped substantially as shown in the drawings and are dimensioned consistent with the above dimensions. The O-rings are made of rubber. The screen 66 in the outlet port 62 is a 60-mesh screen.

The basic steps in the process are as follows:
1. Clean the pipe to be lined.
2. Roughen the outside surface of the liner.
3. Flare one end of the liner and machine the flared end to size.
4. Insert the liner into the pipe to be lined from the coupling end.
5. Attach the special heads to each end of the pipe to be lined with seals against the liner.
6. Incline the pipe so the coupling end is higher than the pin end.
7. Mix the cement slurry.
8. Pump the cement slurry into the annular space between the pipe to be lined and the liner.
9. Vibrate the pipe and liner assembly while pumping in the cement slurry.
10. Place a pressure squeeze on the cement slurry at both ends of the pipe to effect a seal.
11. Remove the special heads from both ends.
12. Allow the cement to cure.
13. Clean any excess cement from the pin end of the pipe and liner and flare the liner.

The pipe section to be lined is cleaned internally to facilitate proper placement of the liner. The ends of the pipe are cleaned to facilitate the attachment of the special heads used in the process. It is expected that steel pipe will be used normally; however the present process can be applied to concrete, asbestos-cement, plastic or any other kind of pipe in which case the cleaning methods would be modified consistent with the material employed.

The outside surface of the liner is roughened in order to obtain an improved bond between the cement and the liner. The roughened surface is readily obtained by sandblasting, but other acceptable methods can be employed.

As indicated above one end of the liner 18 is flared by heating the plastic until it becomes pliable, it is then formed to the flared shape desired and cooled. The unflared end of the tube 18 is introduced into the coupling end of the pipe section 10 and advanced into the pipe section until the flare 54 is just outside the collar 16. The liner 18 must be of sufficient length to extend entirely through the pipe section. The special heads 26 and 44 may now be attached. The head 44 is attached first by inserting the circumferential portion 50 into the open end of the tube 18. The head 44 is now screwed into the coupling such that the flare 54 abuts against the shoulder 52.

The head 26 is now screwed into position on the pin end of the pipe section 10 with the unflared end of the tube 18 protruding outwardly from the hole 30 in the head as shown in FIG. 1. If any great excess of liner extends outwardly from the hole in the head 26, this excess is cut off to leave approximately the amount shown in FIG. 1.

The pipe and liner assembly is now inclined so that the coupling end 16 is slightly higher than the pin end 12. This will permit a complete displacement of all air from the annular space 24 as the cement slurry is pumped in from the pin end. The inclination is approximately 1° or 5 inches in 30 feet.

Figure 2:
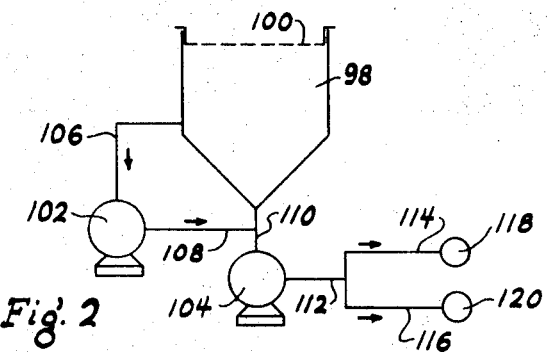
FIG. 2 is a semidiagrammatic representation of an apparatus employed for mixing and distributing the cement slurry.

In the meantime the cement slurry is mixed in the equipment diagrammatically shown in FIG. 2. This equipment consists essentially of a hopper 98 covered by a removable screen 100 and two pumps 102 and 104 driven by a motor or motors (not shown). The pump 102 is the recirculating pump and the pump 104 is the filling or supply pump for supplying the cement slurry to the annular space 24. By way of information (and not by way of limitation) the two pumps used in this example are of the Moyno progressing cavity type which will handle viscous, high-solids fluid without a high degree of turbulence. These pumps have a positive displacement but do not produce pulsation. The inlet to the pump 102 connects with the hopper 98 through the conduit 106. The outlet of the recirculating pump 102 connects back to the hopper 98 through the conduit 108. The inlet to the supply pump 104 connects with the outlet 108 from the pump 102 through the conduit 110. The outlet conduit 110 connects to one or more flexible hoses 114 and 116 which are provided with valves 118 and 120 connecting at the outer ends of these hoses respectively. The conduit 114 (or 116) is adapted to connect with the inlet conduit 36 of the head 26 by means of the quick-disconnect coupler 42. Thus when the valves 40 and 118 are open the supply pump 104 is capable of introducing cement slurry into the annular space 24 through the conduit 36.

A specific mixture of cement slurry which is used in this example is as follows:

5 pound hi-early Portland cement (type III)
2 pounds fly ash (possolanic material)
½ bentonite (montmorillonite material)
5 pounds fresh water
1 percent calcium chloride (accelerating agent)

The recirculating pump 102 is run at a speed to deliver approximately 2 gallons per minute of slurry. The outlet of this pump is just above the inlet of the supply pump 104 such that a well-mixed, creamy cement slurry is delivered to the supply pump at all times. The supply pump is run at a speed that will fill the annular space 24 in approximately 80 seconds. The initial pump pressure from the supply pump 104 is approximately 15 p.s.i. and gradually builds up to approximately 40 p.s.i. as the annular space fills. It should be noted that the head 26 is provided with a groove 126 adjacent the entrance to the annular space 24 so that the cement slurry can enter uniformly and with a minimum of resistance. It should be mentioned also that the pipe and tube assembly is arranged such that the port 36 on the head 26 is downwardly directed at the lower end of the incline and the port 62 on the head 44 is upwardly oriented at the upper end of the incline. Therefore, as the annular space fills with cement slurry, the air is vented through the port 62. The pressure rises rapidly once the annulus 24 is full. When the pump pressure from the supply pump 104 builds up to approximately 65 p.s.i. the valves 40 and 118 are closed, the hose 114 is removed from the disconnect coupler 42 and the slurry can be diverted to the next pipe to be similarly treated.

During the time that the annulus 24 is being filled with cement slurry the assembly is vibrated. Both the vibrator and the pipe support are designated by the reference numeral 96. However the assembly can be supported by two or more individual supports as desired. The vibrator is therefore attached to one of the supports. The vibrator which was used in this example consists of a floating support mounted on springs; a countershaft with an unbalanced shaft is rotated at 1,725 r.p.m. by a belted electric motor (not shown). Whether the support and vibrating means 96 shown in FIG. 1 is considered as two separate means or as a single device is immaterial to the considerations of the present invention.

Returning again to the filling operation, a slight increase in pressure will indicate when the annular space is filled with cement slurry. Thereafter it is preferable to place a pressure squeeze on the slurry to seal both ends. This is accomplished by forming a "bridge" or plug of the solid particles in the slurry at each end of the pipe and by squeezing the water out of the "bridge" with pressure. As water is squeezed out, additional solids build up and the "bridge" mass becomes quite firm. In order to effect the "bridge" at the coupling end, the port 62 is fitted with a screen 66 which will pass air and water but which will become "bridged" or blocked by the solid particles in the cement slurry. A screened port (not shown) may also be provided in the head 26; however it has been discovered that a good "bridge" is effected at this end by making a loose fit between the head 26 and the pipe 10 when fitting this head on the pipe. By a "loose fit" is meant a fit that will not hold water thereby permitting water to be squeezed out of the cement and permitting a buildup of solids. It is at this point that the valves 40 and 118 are closed and the hose 114 disconnected from the connection 42.

After disconnecting the hose 114, the above assembly is allowed to stand for about 30 minutes. The heads are then removed. Although the coupling head 44 can be removed substantially immediately without any difficulty or danger to the product because the liner is firmly held in place by the flare 54, the removal of the head 26 is a more difficult operation in that the liner protruding through this head is unsupported except for the cement bridge which can be destroyed by excessive movement. By having a plurality of heads 26, movement of the specific head 26 can be delayed until the cement is partially set. The setting time can be shortened by an increase in temperature, the use of a high-early-strength-type Portland cement, and/or the use of an accelerating agent; the latter accelerating methods may be used individually or in any combination.

The split and hinged head 26' shown in FIGS. 6 and 7, and as described previously, may be used for the purpose of facilitating the removal of the head at the pin end while minimizing the danger of destroying the cement bridge at that end. Preferably this head 26' is screwed on with a "loose fit" as described above with the latch in the closed position shown in FIG. 6. At the time of removal the latch can be opened to the position shown in FIG. 7 and the head 26' simply removed.

At the end of 2 hours (after the hose 114 is disconnected) the excess cement is removed; after 4 hours the liner at the pin end is flared and machined in a manner similar to the coupling end flaring operation previously described.

The foregoing example has been set forth in considerable detail so that the man skilled in this art will be fully apprised of one complete and specific embodiment of the present invention. However it should be obvious that this invention is not limited to the specific details set forth above. The above process has been described in particular relation to a "threaded and coupled" type of pipe; obviously the present method and apparatus can be adapted to pipe of the grooved end type or the welded joint type. The particular type of liner is not critical to the present invention; although the plastic tube 18 has been described as PVC, any other material having similar properties can be employed; it suffices if the plastic liner employed is capable of being flared in a manner similar to that described herein.

Based upon the above example it will appear that this invention employs a neat cement made from cement slurry consisting essentially of 10 parts by weight of Portland cement,
4 parts by weight of fly ash,
1 part by weight of bentonite,
10 parts by weight of water,
1 percent (of above total) of calcium chloride.

However, although the proportions of Portland cement and water generally remain constant, it is possible to vary the amount of fly ash from two to six parts by weight, the amount of bentonite between one-half and 1½ parts by weight; the calcium chloride, which acts as an accelerator, can be omitted if desired or can be used in amounts up to 3 percent of the total weight. Thus the broad ranges of the cement slurry can be set forth in terms of 10 parts by weight of Portland cement,
two to six parts by weight of fly ash,
one-half to 1½ parts by weight of bentonite,
10 parts by weight of water,
0 to 3 percent (of above total) of calcium chloride.

The above ingredients are preferably mixed in a conventional cement mixer (not shown) and then transferred to the hopper 98.

Figure 3:
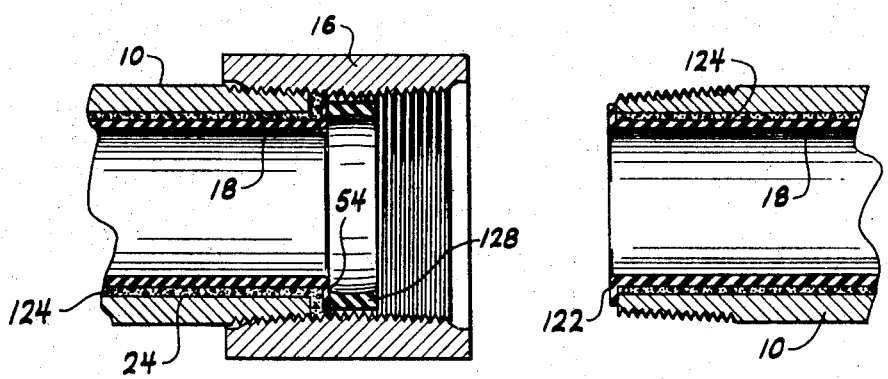
FIG. 3 is a fragmentary sectional view showing the intermating relationship between the adjacent end of two pipe sections which are constructed in accordance with the present invention.

FIG. 3 shows the mating ends of two pipe sections lined in accordance with the present invention. The cement lining which was introduced into the annular space 24 and which is now hardened and cured is designated by the reference numeral 124. The left-hand end of the liner 18 has been flared and machined to produce the flare 122 in substantially the same manner as has been described above in connection with the flare 54. When inserting the pin end of the right hand pipe section 10 into the coupling end of the left-hand pipe section 10 it is desirable to include an annular sealing gasket 128 which can be similar to that shown in Routh U.S. Pat. No. 2,805,872 issued Sept. 10, 1957 and entitled "Lined Pipe Coupling With Internally Flush Gasket."

In the event that the pipe section 10 is provided with two pin ends 12 (the coupling 16 having been removed or being removable), then two heads such as the head 26 are employed. However, one port 36 will be downwardly directed at the lower end of the incline and the other port 36 will be upwardly directed at the upper end of the incline. Heads similar to heads 26 and 44 can be employed in modified form for use in conjunction with other types of pipe sections. The head 44 is described as having a hollow bore 60; naturally the head 44 could be a solid plug, if desired; however, the port 62 must communicate to the atmosphere in some manner through the head 44. The threads in the coupling 16 are preferably tapered into the center from both ends such that the center of the coupling has the smallest inside diameter of any part of the coupling.

Whereas the present invention has been described in particular relation to the drawings attached hereto and the specific example set forth herein it should be understood that other and further modifications, apart from those shown or suggested herein, may be made within the spirit and scope of this invention.

What I claim is:

1. Apparatus for lining an elongated pipe section having a predetermined length and an internal bore of a predetermined diameter, comprising an elongated plastic tube mounted within said pipe in concentric relation therewith, said plastic tube being longer than said pipe section and having an outer diameter less than the bore of said pipe section so as to form an annular space therewith for substantially the full length of said pipe section, a first head engaging one end of said pipe section and said tube, a second head engaging the other end of said pipe section and said tube, said first and second heads supporting said tube in concentric relation with respect to said pipe section, said heads also constituting sealing means for closing the ends of said annular space adjacent the ends of said pipe section, said first head being provided with a first port communicating with said annular space and with the atmosphere, said second head having a second port communicating with said annular space and the atmosphere, and means for introducing a cement slurry under pressure into said annular space through one of said ports so as to fill said annular space.

2. Apparatus as set forth in claim 8 including means for supporting said pipe section in an inclined position while said cement slurry is being introduced into said annular space, said cement slurry being introduced into said annular space through the one of said ports which is adjacent the lower end of said incline.

3. Apparatus as set forth in claim 2 including means for vibrating said pipe section while said cement slurry is being introduced into said annular space.

4. Apparatus as set forth in claim 3 including a screen mounted on the port which is adjacent the upper end of said incline.

5. Apparatus for lining an elongated pipe section having a pin end with external threads thereon and an enlarged coupling end with internal threads thereon, the internal threads of said coupling end being adapted to mate with the external threads on the pin end of another pipe section of the same diameter as the first-mentioned pipe section, comprising a first hollow and circular head having external threads thereon mating with and received in the threaded portion of the coupling end of said pipe section, said first head being provided with a first circumferential portion located longitudinally inwardly of its threaded portion and having an outer diameter less than the internal diameter of the coupling end of said pipe section, said first head having an internal bore communicating with the internal bore of said pipe section, said first head having a first port extending from said first circumferential portion to said bore of said first head, said first head being provided with a second circumferential portion located longitudinally inwardly of said first circumferential portion and having an outer diameter less than the outer diameter of said first circumferential portion, said second circumferential portion connecting with said first circumferential portion by means of a radial shoulder, said second circumferential portion having an annular groove with a first O-ring received therein, a second hollow and circular head having internal threads thereon mating with and received over the threads on the pin end of said pipe section, said second head having a circular hole coaxial with the longitudinal axis of said pipe section, said hole having an annular recess with a second O-ring mounted therein, an elongated plastic tube mounted within said pipe in concentric relation therewith, said plastic tube having an outer diameter less than the inner bore of said pipe section so as to form an annular space therewith for substantially the full length of said pipe, said plastic tube having a flared end abutting against the shoulder of said first head, the outer diameter of said flare being larger than the internal bore of said pipe section but being of smaller diameter than the internal diameter of said coupling end so as to provide open communication between said annular space and said first port in said first head, the internal diameter of said plastic tube being substantially equal to the external diameter of said second circumferential portion whereby the flared end of said tube is received over said second circumferential portion and is maintained in sealed relation with respect thereto by means of said first O-ring, the other, unflared, end of said plastic tube extending outwardly from and beyond the hole in said second head, said hole in said second head having a diameter substantially equal to the external diameter of said plastic tube whereby said plastic tube is held in sealed relation with respect to said second head by virtue of said second O-ring, said second head having a second port extending from an external location on said second head to an internal location communicating with said annular space, means for supporting the assembly of the above-recited elements in an inclined position with one of said ports being upwardly directed at the upper end of said incline and the other of said ports being downwardly directed at the lower end of said incline, a screen mounted in the upper port and covering the cross-sectional area thereof, means for introducing a cement slurry under pressure into said annular space through the lower port so as to fill said annular space, and means for vibrating said assembly during the time that said cement slurry is being introduced into said annular space.